United States Patent

Asama et al.

[11] Patent Number: 5,929,778
[45] Date of Patent: Jul. 27, 1999

[54] DATA CARRIER SYSTEM

[75] Inventors: Hajime Asama; Hayato Kaetsu, both of Wako; Shin-ya Kotosaka, Tokyo; Isao Endo, Wako; Sakae Miyao; Atsusi Nakamura, both of Nagano, all of Japan

[73] Assignees: Rikagaku Kenkyusho, Saitama; Sigma Systems Co., Ltd., Tokyo, both of Japan

[21] Appl. No.: 08/555,592

[22] Filed: Nov. 9, 1995

[30] Foreign Application Priority Data

Nov. 10, 1994 [JP] Japan .................................. 6-301373

[51] Int. Cl.⁶ .............................. H04Q 7/00; H04Q 9/00
[52] U.S. Cl. .............................. 340/825.54; 340/825.35; 340/505; 340/568; 340/571; 340/572
[58] Field of Search ........................ 340/825.54, 825.49, 340/825.35, 505, 568, 571, 572

[56] References Cited

U.S. PATENT DOCUMENTS

| | | |
|---|---|---|
| 5,070,500 | 12/1991 | Horinouchi et al. .................. 370/69.1 |
| 5,113,184 | 5/1992 | Katayama .......................... 340/825.54 |
| 5,216,419 | 6/1993 | Fujisaka et al. .................... 340/825.54 |
| 5,218,343 | 6/1993 | Stobbe et al. ........................... 340/572 |
| 5,235,326 | 8/1993 | Beigel et al. ....................... 340/825.54 |
| 5,321,395 | 6/1994 | Van Santbrink .................... 340/825.31 |
| 5,539,393 | 7/1996 | Barfod ............................... 340/825.52 |

*Primary Examiner*—William A. Cuchlinski, Jr.
*Assistant Examiner*—Yonel Beaulieu
*Attorney, Agent, or Firm*—Birch, Stewart, Kolasch & Birch, LLP

[57] ABSTRACT

A data carrier system allows data to be transmitted and received. The data is transmitted using weak radio waves of suitable frequencies, such as frequencies in a high frequency band (HF) or a very high frequency band (VHF). The transmitters and receivers need not physically contact each other, be located in any particular position, or be oriented in any particular direction. The data carrier system does not suffer deficiencies in electric power supply, and therefore there exists no need to exchange batteries. Individual transmitters and receivers are positively discriminated one from another. The receivers are in the form of a plurality of tags. The transmitters are in the form of a plurality of reader-writers. Both are controlled by microcomputers, and each tag is equipped with a secondary battery as the power source.

18 Claims, 6 Drawing Sheets

FIG. 4
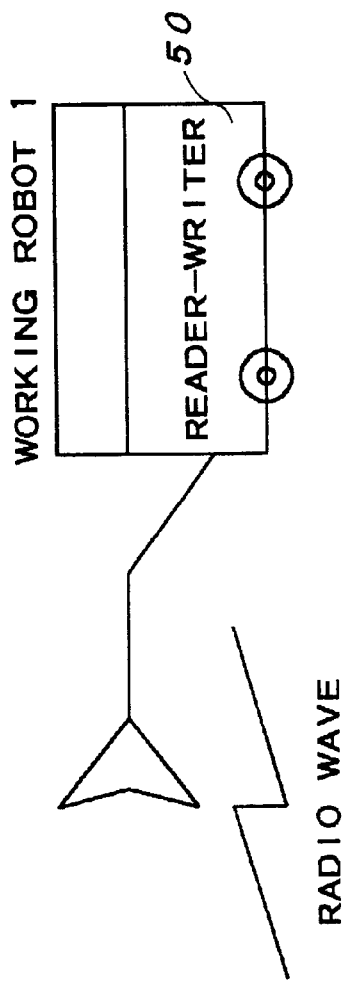
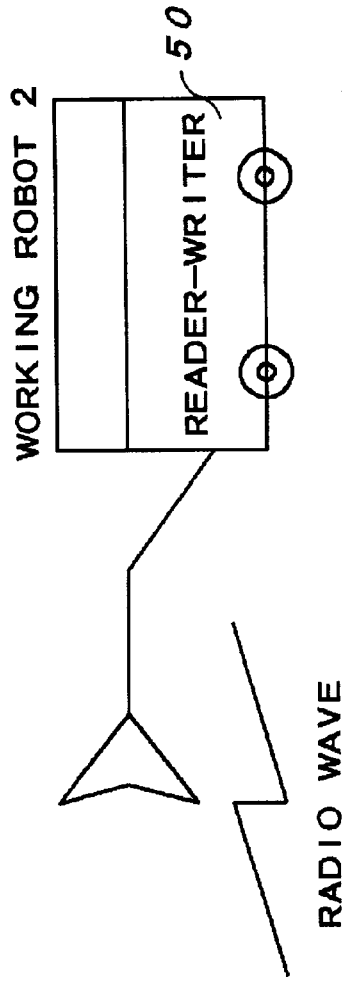
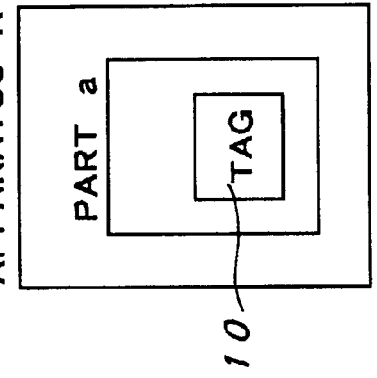
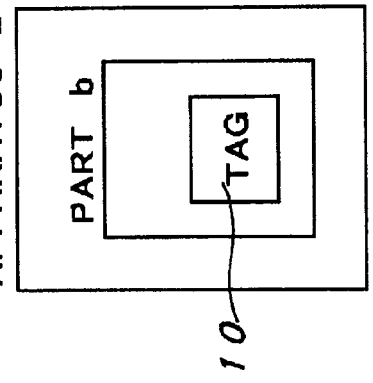

DATA CARRIER SYSTEM

BACKGROUND OF THE INVENTION

1. Field of the Invention

The present invention relates to a data carrier system, and more particularly to a data carrier system which transmits and receives data in accordance with a non-contact manner wherein electromagnetic waves (employing weak radio waves) are used.

2. Description of the Related Art

Heretofore, in physical distribution control such as control of taking out of storage and putting into storage in a plant, or security control for controlling entrance and exit of personnel in facilities such as an office and a plant, it has been proposed to use a data carrier system provided with a tag composed of, for example, an IC card storing prescribed data, a transmitter for transmitting instructions for requesting the data stored by the tag thereto, and a receiver for receiving the data transmitted from the tag on the basis of the requesting instructions derived from the transmitter, whereby the data stored in the tag is effectively used.

As such a data carrier system, for example, the one in which electromagnetic induction is used as the base of the system has been known. A data carrier system wherein electromagnetic induction is applied as the base of the system uses such a principle that when a current is passed through a circular coil-shaped antenna of a controller constituted integrally from the above described transmitter and the receiver, a magnetic field is generated around the coil-shaped antenna, and in such a case if there is a coil on the side of the tag within a range of the magnetic flux of the magnetic field, a current is produced in the coil of the tag side due to changes in the magnetic field appeared around the coil-shaped antenna of the controller.

FIG. 5 shows the constitution of a data carrier system using electromagnetic induction as the basic principle wherein a tag 100 is composed of a memory 102 for storing data consisting of a nonvolatile memory storing prescribed data, a signal control section 104, a modulating-demodulating section 106, an electric power detecting section 108, a first coil 110, and a second coil 112. In this case, the tag 100 does not contain a power source such as a battery and the like.

Furthermore, a plurality of tags 100 are provided for practical use, and they are held by prescribed objects in such a manner that a tag is on board of an article to be transported, or a person carries such a tag.

On the other hand, a controller 200 is composed of a circular coil-shaped antenna 202, a modulating-demodulating section 204, a data processing section 206, a communicating section 208 for communicating with an external computer and the like, and a power source section 210 to which is supplied electric power from an external power source.

First, the controller 200 transmits radio waves for electric power to be fed to the tag 100 from the antenna 202 as the radio wave having a first frequency. As a result, a magnetic field is generated around the antenna 202 as described above, and in this situation, if there is the tag 100 within a range of the magnetic flux in this magnetic field, a current is generated in the second coil 112 of the tag 100 due to changes in the magnetic field appeared around the antenna 202 of the controller 200. In accordance with the process as described above, when the current is generated, the tag 100 takes out electric power from the current through the electric power detecting section 108.

Then, the controller 200 transmits the radio wave having a second frequency different from the first frequency as a control signal for the tag 100. As a consequence, a magnetic field is produced around the antenna 202 as described above, and in this case if there is the tag 100 in a range of the magnetic flux of this magnetic field, a current is produced in the first coil 110 of the tag 100 due to changes in the magnetic field appeared around the antenna 202 of the controller 200. In accordance with the process as described above, when the current representing a control signal is produced in the first coil 110, the tag 100 carries out data processing in the signal control section 104 after demodulating the control signal from the aforesaid current in the modulating-demodulating section 106. The signal control section 104 writes data into or reads data from the memory 102 in response to the contents of the control signal.

In case of writing data, the data is written into the memory 102 in response to the contents of the control signal, while in case of reading data, the data read from the memory 102 is modulated through a modulating circuit involved in the modulating-demodulating section 106, and the data thus modulated is transmitted from the first coil 110 to the controller 200 as radio waves.

Thus, the radio waves transmitted from the first coil 110 are received by the antenna 202 of the controller 200, the radio waves thus received by the antenna 202 are demodulated through the modulating-demodulating section 204, and then they are processed as digital data.

Furthermore, as another data carrier system, the one in which radio waves are used has been also known. FIG. 6 shows the constitution of such a data carrier system employing radio waves in which the radio waves having different two types of frequencies are also used.

The data carrier system shown in FIG. 6 is provided with the number N of tags 300 each having the same constitution as a tag, a receiving apparatus 400, and a transmitting apparatus 500.

The tag 300 is composed of a memory 302 for storing data consisting of a nonvolatile memory in which has been stored prescribed data, a signal control section 304, a modulating-demodulating section 306, a receiving section 308, a transmitting section 310, an antenna 312, and a battery 314.

On the other hand, the receiving apparatus 400 is composed of an antenna 402, a receiving section 404, a demodulating section 406, an information analyzing section 408, a display section 410, and a power source section 412 to which is fed electric power from an external power source. Furthermore, the transmitting apparatus 500 is composed of an antenna 502, a transmitting section 504, a modulating section 506, an information setting section 508, and a power source section 510 to which is fed electric power from an external power source.

As described above, the data carrier system of this type utilizing radio waves uses the radio waves of two different frequencies wherein the radio wave of a first frequency is used as a reminding radio wave requested by the transmitting apparatus 500 for demanding transmission of the data stored in the memory 302 with respect to N of tags 300. More specifically, the reminding radio wave is set by the information setting section 508 to acquire desired data from among the data stored in the memory 302 of the tag 300, the data thus acquired is modulated by the modulating section 506, and then is transmitted from the antenna 502 through the transmitting section 504. The reminding radio wave thus transmitted is received by the receiving section 308, the reminding radio wave received is demodulated by the modulating-demodulating section 306, and then is subjected to data processing in the signal control section 304. The signal control section 304 writes data from the memory 302 in response to the contents of the reminding radio wave.

In the tag 300 which received the reminding radio wave, the data read from the memory 302 is controlled by the signal control section 304 in response to the reminding radio wave received, the controlled data is modulated by the modulating-demodulating section 306, and the data thus modulated is transmitted from the antenna 312 to the receiving apparatus 400 through the transmitting section 310 as the radio wave of a second frequency.

The radio wave of the second frequency to be transmitted to the receiving apparatus 400 is used also for confirming whether or not the tag(s) 300 other than the tag 300 itself which received the reminding radio wave transmit(s) the radio wave of the second frequency within a prescribed period of time in order to avoid simultaneous transmission of the radio wave from the plural tags 300 to the receiving apparatus 400. In the case when the tag(s) 300 other than the tag 300 which received the reminding wave do(es) not transmit the radio wave of the second frequency, the data read from the memory 302 into the tag 300 which received the reminding radio wave as described above is transmitted therefrom as the radio wave of the second frequency.

The radio wave of the second frequency thus transmitted is received by the receiving section 404 through the antenna 402 of the receiving apparatus 400, the data contained in the radio wave of the second frequency is demodulated through the demodulating section 406, the demodulated data is processed as digital data in the information analyzing section 408, and the required contents of the data are displayed on the display section 410.

As described above, the tag 300 of the data carrier system wherein radio waves are used incorporates the battery 314 which usually supplies electric power only to the receiving section 308 of the tag 300 for the sake of achieving low power consumption, and it is adapted to feed the electric power to the whole circuit construction in only the case when the receiving section 308 receives the reminding radio wave.

In the above described data carrier system wherein electromagnetic induction is used as the basic principle, however, an electric current is produced in a coil in the case when both the centers of two coils exist only on the same axes or in the vicinity thereof, so that a positional relationship between the coil of the tag and the antenna (coil) of the controller is inevitably restricted substantially in view of a three dimensional situation. For this reason, there have been such problems that a range for the detection with respect to directions and positions of the tag and the controller is extremely narrowed, and that a distance within which data can be transmitted and received is shortened.

Recently, such a data carrier system having around 1 meter of a reading distance of the data stored in the memory of a tag has also been proposed in data carrier systems wherein electromagnetic induction is used as the basic principle. In the data system proposed, however, a comparatively large amount of electric power is required in case of writing data into the memory of the tag as compared with the case of reading data from the memory, so that the electric power becomes short dependent only upon the electro motive force due to the electromagnetic induction, and as a consequence a distance defined between the coil of the tag and the antenna (coil) of the controller in case of writing data into the memory becomes about 1/5 in case of reading data from the memory.

Furthermore, in recent years, since an increase in the memory capacity of a tag has been intended, an operating time of the tag becomes inevitably longer, hence in this respect also, there has been such a problem that electric power becomes short dependent only upon the electro motive force derived from electromagnetic induction, so that a stable operation of the tag cannot be expected.

In addition to the above, there has been also such a problem that when a plurality of tags exist in a detecting range which can be covered by the antenna of a controller, individual tags cannot be indeed discriminated.

On the other hand, since radio waves are used for transmitting and receiving data in the above described data carrier system wherein radio waves are employed, a distance for transmitting and receiving data can be extended, besides there is no restriction as to positions and directions on the sides of transmission and reception, respectively, and in addition since a battery is used for a tag, there is not a case where the electric power becomes short in the tag. However, the data carrier system of this type has involved such a problem that since it is required to continue always feeding of electric power to the receiving section of a tag, the life of a battery becomes short, so that operations for exchanging the battery or a replacement of the tag and the like operations must be frequently carried out.

Moreover, it is proposed to intend the improvement of processing by reducing a waiting time of each tag with respect to a reminding radio wave in the case where a plurality of tags exist in a detecting range which can be covered by a receiving apparatus. However, there has been such a problem that since there is a limit for reducing a reminding period of time to be assigned to each tag in the case where a number of tags invade within the detecting range, so that individual tags cannot sufficiently be discriminated.

OBJECTS AND SUMMARY OF THE INVENTION

The present invention has been made in view of a variety of such problems involved in the prior art, and an object of which is to provide a data carrier system which can extend a distance within which data can be transmitted and received in accordance with a non-contact manner wherein the electromagnetic wave having a suitable frequency such as a high frequency band (HF band or VHF band) frequency is employed, besides in which there is no restriction as to positions and directions of the devices on a transmitting side as well as of the devices on a receiving side in case of the transmission and the reception of data.

Furthermore, another object of the present invention is to provide a data carrier system by which a problem of electric power shortage can be eliminated without accompanying a complicated operation for exchanging a battery or the like operations to maintain a stable action.

Moreover, a further object of the present invention is to provide a data carrier system in which individual devices on the transmitting side and individual devices on the receiving side can be positively discriminated one another.

In order to attain the above described objects, the data carrier system according to the present invention is constituted as described hereinbelow. Namely, the data carrier system of the invention performing transmission and reception of data in accordance with a non-contact manner by using electromagnetic waves (employing weak radio waves) comprises a plurality of tags and a plurality of reader-writers, both of them being controlled by microcomputers, respectively; the aforesaid tag being composed of a secondary battery as the power source; a storing means for renewably storing data; a receiving means for receiving the data transmitted from a reader-writer or another tag; a transmitting means for selectively transmitting the data stored in the aforesaid storing means in response to the data received by the aforesaid receiving means, a data for requesting transmission of the data stored in the reader-writer or the other tag, and a data for instructing to rewrite the data stored in the reader-writer or the other tag to the reader-writer or the other tag; and a renewing means for renewing the data stored in the aforesaid storing means in response to the data received by the aforesaid receiving means; the aforesaid reader-writer being composed of a power source means fed from an external power source; a storing means for renewably storing data; a receiving means for receiving the data transmitted from another reader-writer or a tag; a transmitting means for selectively transmitting the data stored in the aforesaid storing means in response to the data received by the aforesaid receiving means, data for requesting transmission of the data stored in the other reader-writer or the tag, and data for instructing to rewrite the data stored in the other reader-writer or the tag to the other reader-writer or the tag; and a renewing means for renewing the data stored in the aforesaid storing means in response to the data received by the aforesaid receiving means.

Furthermore, according to another aspect of the present invention, the data carrier system relates to the one wherein information specifying a prescribed tag or a prescribed reader-writer is allowed to contain in the data transmitted from the aforesaid reader-writer or the aforesaid tag by means of the aforesaid transmitting means of the aforesaid reader-writer or the aforesaid transmitting means of the aforesaid tag, whereby only an outputting means of the reader-writer or the tag specified by the information which specifies the aforesaid prescribed tag or the aforesaid prescribed reader-writer outputs the data, besides only the aforesaid renewing means of the reader-writer or the tag specified by the information which specifies the aforesaid prescribed tag or the aforesaid prescribed reader-writer renews the data.

The data carrier system according to the present invention relates to the one in accordance with a non-contact manner by using electromagnetic waves (employing weak radio waves). Consequently, according to the data carrier system of the present invention, a distance defined between tags, between a tag and a reader-writer, or between reader-writers within which data can be transmitted and received can be extended, besides there is no restriction as to the positions and the directions of devices on the transmitting side and devices on the receiving side.

In addition to the above, since a tag is equipped with a secondary battery, a problem of shortage of electric power can be removed by charging the secondary battery without accompanying a complicated operation for exchanging a battery or the like complicated operations to thereby maintain a stable action.

Moreover, in the data carrier system of the present invention, since data are transmitted and received after allowing the information which identifies individually tags and reader-writers to contain in the data, only a specified tag or a specified reader-writer can be operated.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is an explanatory view used for explaining an operating condition of the data carrier system according to the present invention;

DETAILED DESCRIPTION OF THE PREFERRED EMBODIMENT

An embodiment of the data carrier system according to the present invention will be described in detail hereinbelow in conjunction with the accompanying drawings.

Figure 1:
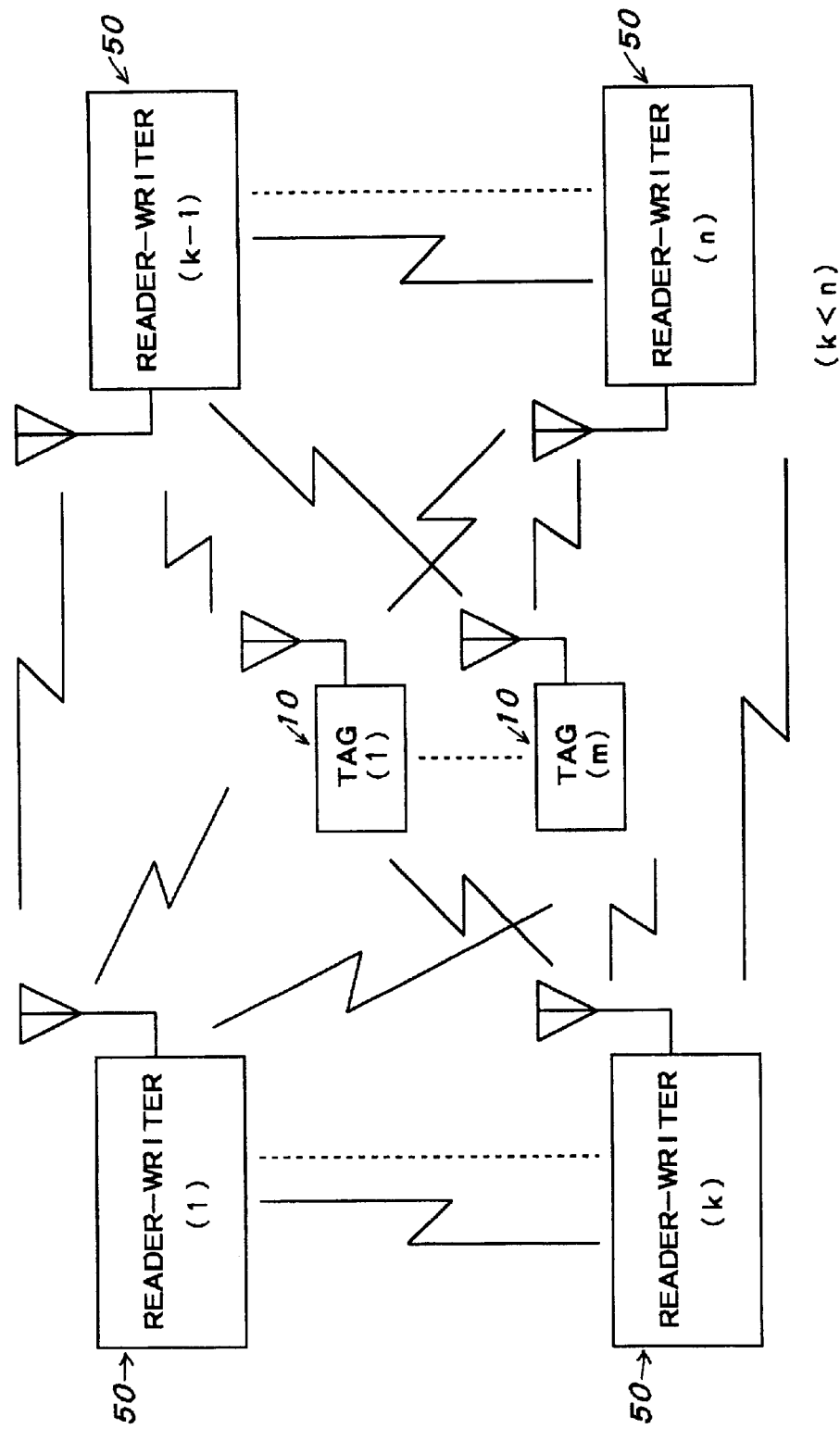
FIG. 1 is a conceptual diagram showing the whole systematic constitution of the data carrier system according to the present invention.

FIG. 1 is a conceptual diagram showing the whole systematic construction of the data carrier system according to the present invention.

The data carrier system of this type comprises a tag 10 and a reader-writer 50 for reading and writing the data stored in the tag 10 as the basic components. A plurality of both the tags 10 and the reader-writers 50 may be provided, respectively, in the data carrier system. In FIG. 1, such a construction comprising the number m (m is a positive integer) of tag(s) 10, and the number n (n is a positive integer) of reader-writer(s) 50 which is constructed as a peeringly distributed system being capable of transmitting to and receiving from data between these tags 10 and reader-writers 50 as well as between plural tags 10, and also between the plural reader-writers 50, respectively.

The transmission and reception of data between the above described tag 10 and the reader-writer 50 as well as between the plural tags 10, and also between the plural reader-writers 50 is carried out in accordance with a non-contact manner by employing weak radio waves having a frequency of high frequency band (HF band or VHF band). As a result, such a constitution wherein each of the distances defined between the tag 10 and the reader-writer 50 as well as between the plural tags 10, and also between the reader-writers 50 is extended and at the same time, there is no restriction with respect to positions and directions of the transmission sides and the reception sides can be achieved.

Figure 2:
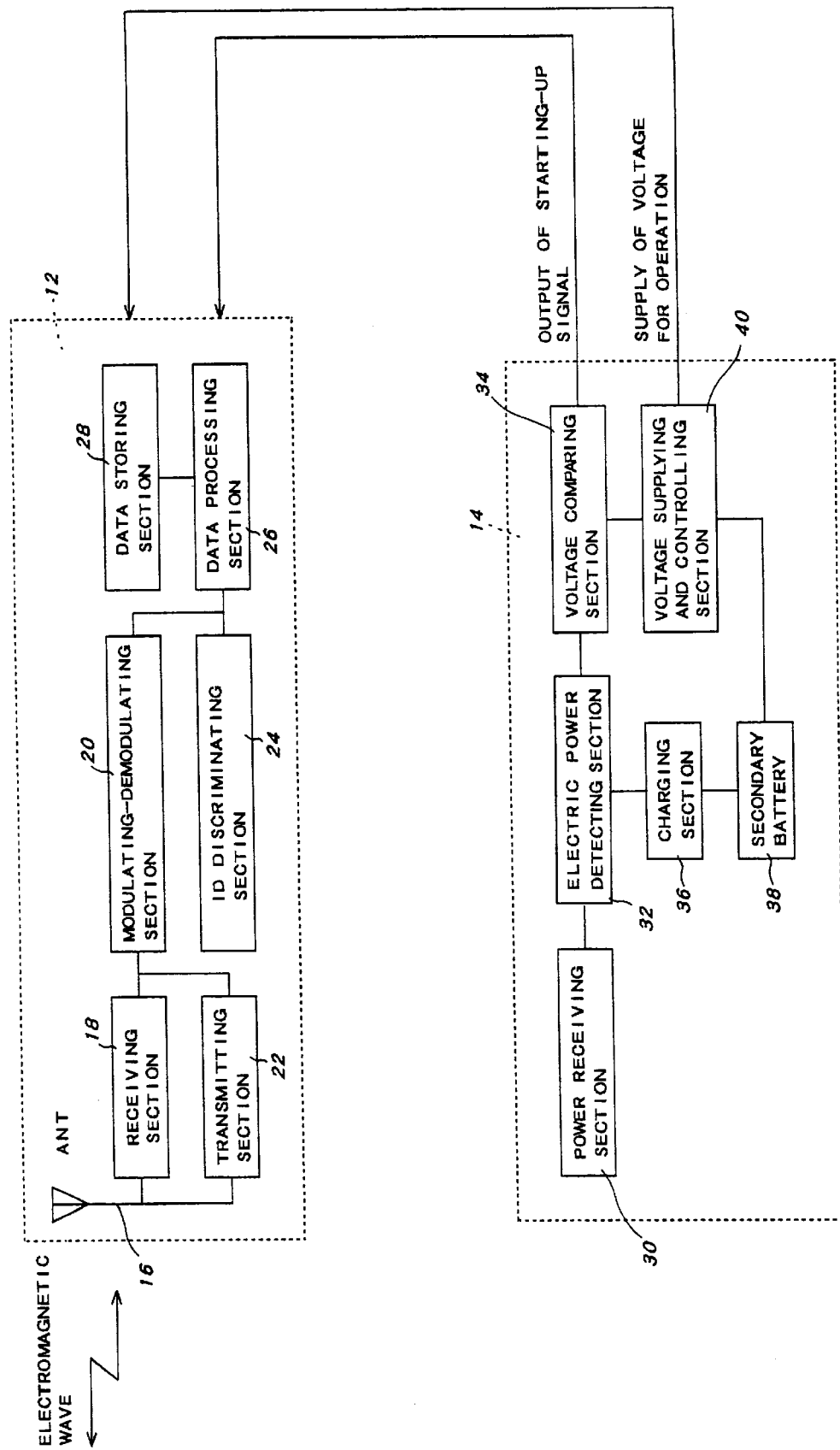
FIG. 2 is a block constitutional diagram showing a tag in the data carrier system according to an embodiment of the present invention.

Now, the constitution of the tag 10 will be described hereinbelow by referring to FIG. 2. The tag 10 is composed of a data processing unit 12 and an electric power supply unit 14.

The data processing unit 12 has an antenna 16 which receives the radio wave having a first frequency transmitted from a reader-writer 50 or another tag 10 and also transmits data therefrom by itself using the radio wave having the first frequency; a receiving section 18 which performs impedance conversion of the radio wave received by the antenna 16 and also performs high-frequency amplification; a modulating-demodulating section 20 which effects an action (demodulating action) for subjecting the radio wave which has already been subjected to impedance conversion and high frequency amplification in the receiving section 18 to signal conversion into digital data which can be processed in a data processing section 26 which will be mentioned hereunder and also modulates the data supplied from the data processing section 26 and which is to be outputted to the reader-writer 50; a transmitting section 22 for amplifying the data modulated by the modulating-demodulating section 20 to radiate the amplified data from the antenna 16; an ID discriminating section 24 for comparing specific codes (the codes for identifying individually the respective tags 10 as well as the respective reader-writers 50) contained in the digital data demodulated from the radio wave received with each other and detecting the same; the data processing section 26 composed of a one-chip microcomputer and for effecting varieties of processing such as storing the digital data obtained by demodulating the data received in the undermentioned data storing section 28, delivering such data which have been stored in the data storing section 28 in response to the data received to the transmitting section 22 through the modulating-demodulating section 20, and the like processing; and the data storing section 28 composed of an EEPROM (an electrically erasable, writable and readable memory, and which is a non-volatile memory being capable of maintaining data even when power is shut down) which can store previously prescribed data, besides the contents of which can be stored or rewritten in response to the data received and an SRAM (data disappear when power is shut down) being a working area for the action in the data processing section 26.

Furthermore, the electric power supply unit 14 comprises a power receiving section 30 (the power receiving section 30 is composed of, for example, an antenna and the like) for starting up the tag 10 transmitted from the reader-writer 50 and also for receiving a tag starting-up and operating radio wave for starting up the tag 10 and also operating the same; an electric power detecting section 32 for taking out, as the electric power, the tag starting-up and operating radio wave which was received by the power receiving section 30 through a coil, a rectifying circuit, and a smoothing circuit; a voltage comparing section 34 for comparing voltages to detect whether or not the voltage taken out from the electric power detecting section 32 is in such voltage by which the one-chip microcomputer constituting the data processing section 26 can be started up by means of a voltage comparing circuit, and if the detected voltage is the one by which the one-chip microcomputer can be started up, its starting-up signal being supplied to the data processing section 26, thereby starting up the one-chip microcomputer; a charging section 36 for charging the electric power taken out from the electric power detecting section 32 into the undermentioned secondary battery 38; the secondary battery 38 being charged by the charging section 36; and a voltage supplying and controlling section 40 for supplying the electric power taken out from the electric power detecting section 32 and the voltage for operation taken out from the secondary battery 38 to the whole constitutional sections of the tag 10 or stopping the supply of such electric power thereto on the basis of the signals in the voltage comparing section 34.

Figure 3:
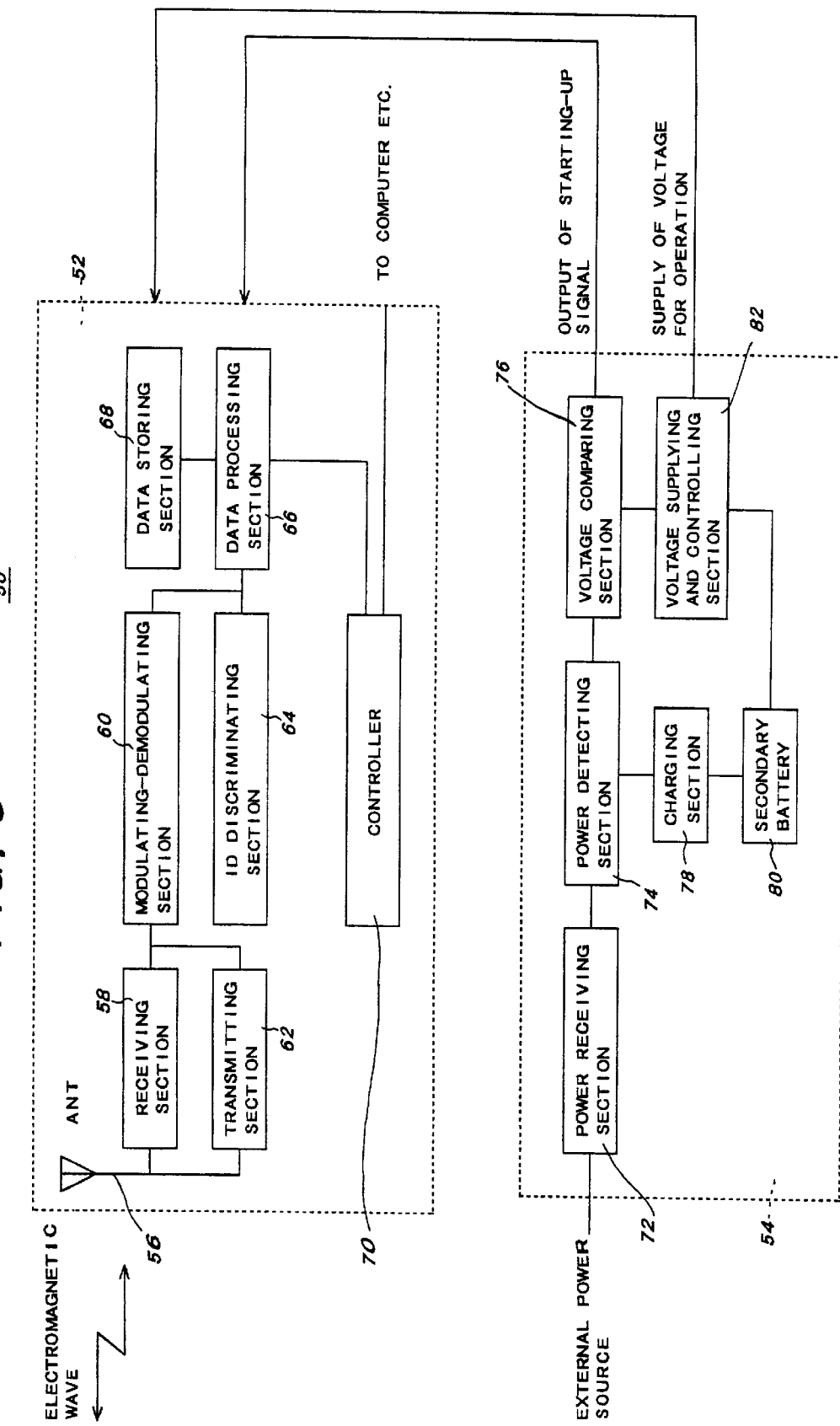
FIG. 3 is a block constitutional diagram showing a reader-writer in the data carrier system according to an embodiment of the present invention.
Figure 5:
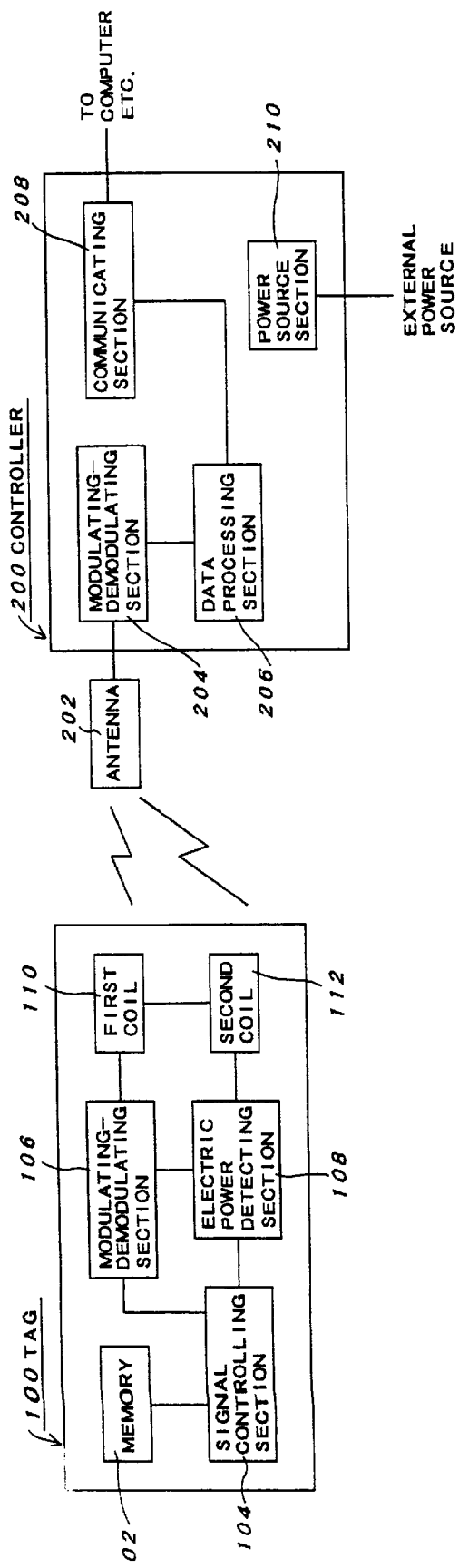
FIG. 5 is a block constitutional diagram showing a conventional data carrier system wherein a principle of electromagnetic induction is used.
Figure 6:
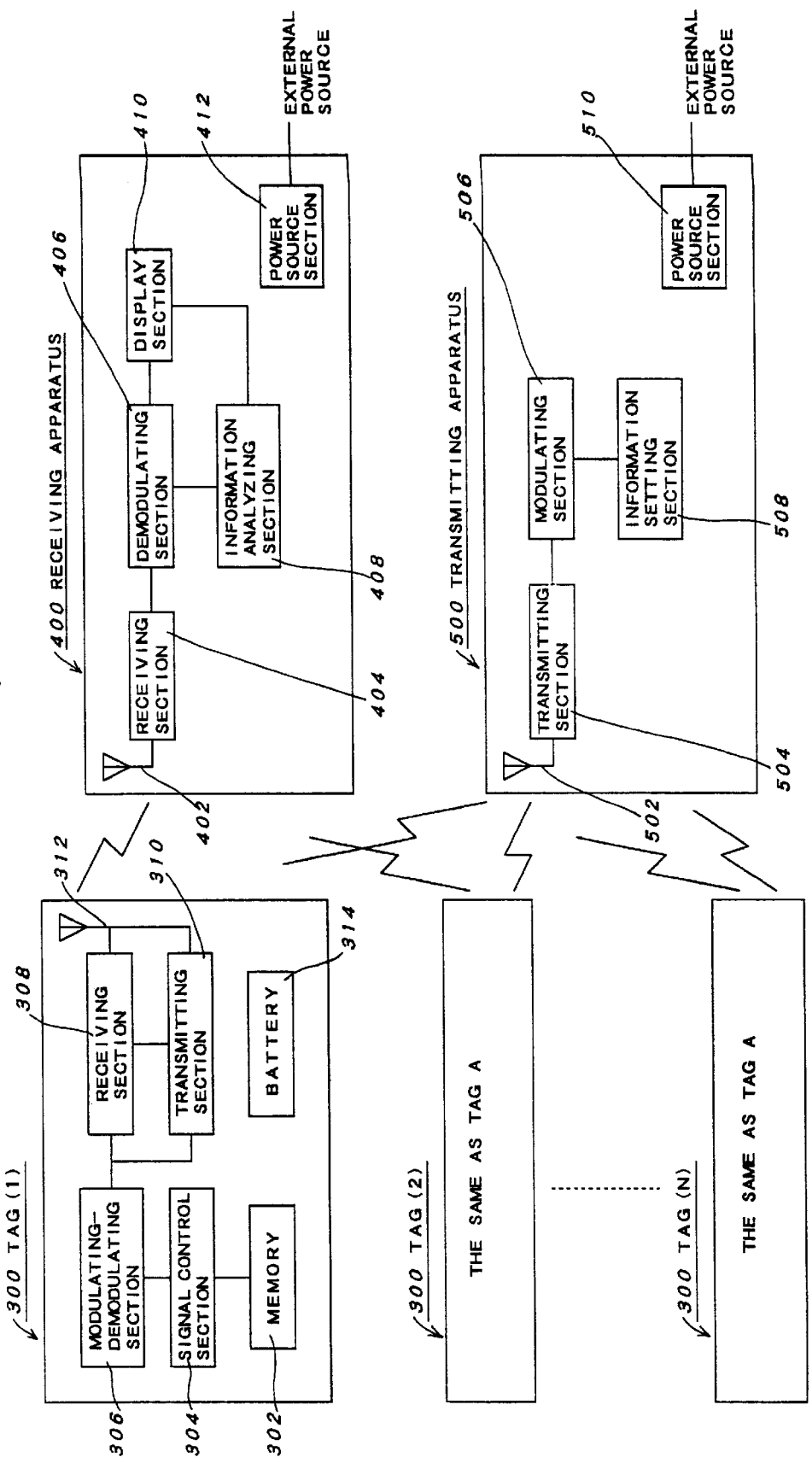
FIG. 6 is a block constitutional diagram showing a conventional data carrier system using radio waves.

The constitution of the reader-writer 50 will be described hereinbelow by referring to FIG. 3. The reader-writer 50 is composed of a data processing unit 52 and an electric power supply unit 54 as in the case of the tag 10.

The data processing unit 52 has an antenna 56 which receives the radio wave having a first frequency transmitted from another reader-writer 50 or a tag 10 and also transmits data therefrom by itself using the radio wave having the first frequency; a receiving section 58 which performs impedance conversion of the radio wave received by the antenna 56 and also performs high-frequency amplification; a modulating-demodulating section 60 which effects an action (demodulating action) for subjecting the radio wave which has already been subjected to impedance conversion and high frequency amplification in the receiving section 58 to signal conversion into digital data which can be processed in a data processing section 66 which will be mentioned hereunder and also modulates the data supplied from the data processing section 66 and which is to be outputted to the reader-writer 50; a transmitting section 62 for amplifying the data modulated by the modulating-demodulating section 60 to radiate the amplified data from the antenna 56; an ID discriminating section 64 for comparing specific codes (the codes for identifying individually the respective tags 10 as well as the respective reader-writers 50) contained in the digital data demodulated from the radio wave received with each other and detecting the same; the data processing section 66 composed of a one-chip microcomputer and for effecting varieties of processing such as storing the digital data obtained by demodulating the data received in the undermentioned data storing section 68, delivering such data which have been stored in the data storing section 68 in response to the data received to the transmitting section 62 through the modulating-demodulating section 60, and the like processing; the data storing section 68 composed of an EEPROM which can store previously prescribed data, besides the contents of which can be stored or rewritten in response to the data received and an SRAM being a working area for the action in the data processing section 66; and a controller 70 for controlling data communications among robots each mounting the reader-writer 50 and handling the data to be transmitted and received between the tag 10 and the reader-writer 50.

Furthermore, the electric power supply unit 54 comprises a power receiving section 72 for receiving the electric power for driving the reader-writer 50 from a direct current power source as an external power source as well as receiving the electric power for supplying to the tag 10; an electric power detecting section 74 for detecting the appearance of the electric power in the power receiving section 72 or monitoring the final voltage of a secondary battery 80 for backup use; a voltage comparing section 76 for comparing voltages to detect whether or not the voltage taken out from the electric power detecting section 74 is in such voltage by which the reader-writer 50 can be started up by means of a voltage comparing circuit, and if the detected voltage is the one by which the reader-writer can be started up, then outputting a starting-up signal which starts up the reader-writer 50; a charging section 78 for charging the electric power taken out from the electric power detecting section 74 into the undermentioned secondary battery 80; the secondary battery 80 being charged by the charging section 78 and serving as backup use for an SRAM in the data storing section of the reader-writer 50; and a voltage supplying and controlling section 82 for supplying the voltage for operation taken out from the electric power detecting section 74 and the voltage for operation taken out from the secondary battery 80 to the whole constitutional sections of the reader-writer 50 or stopping the supply of such voltages thereto on the basis of the signals in the voltage comparing section 76.

In the above described constitution, operations of the data carrier system according to the present invention in the case of an example where consumables are maintained and exchanged by working robots of a mobile type in a plant or the like will be described hereinbelow by referring to FIG. 4.

First, the tags 10 have been attached to the renewal part a of an apparatus A and the renewal part b of an apparatus B, respectively. Further, a date of renewal, a number of times in renewal, contents of failure and the like have been written in the data storing sections 28 of the tags 10 attached to the renewal parts a and b, respectively. In addition, the reader-writers 50 are attached to a mobile robots 1 and 2, respectively.

In these circumstances, the working robot 1 approaches the apparatus A for maintenance, and then the reader-writer 50 attached to the working robot 1 transmits the radio wave having the first frequency to the tag 10. In general, only the power receiving section 30 operates always in the tag 10, because of the realization of low power consumption. However, when the radio wave having the first frequency is received by the power receiving section 30, the power is supplied to the whole constituting sections in the electric power supplying unit 14, a starting-up signal is supplied to the data processing unit 12 through the voltage comparing section 34 and at the same time, a voltage for operation is supplied to the data processing unit 12 through the voltage supplying and controlling section 40, whereby the whole constituting sections of the data processing unit 12 comes to be in an operating condition.

In this case, the secondary battery 38 is charged by the charging section 36 of the tag 10 due to the radio wave having the first frequency.

When the tag 10 confirms to be capable of transmitting data in the data processing section 26, the tag 10 returns a transmissible signal to the reader-writer 50 of the working robot 1 from the antenna 16 by employing the radio wave having the second frequency.

When the transmissible signal is received by the reader-writer 50 of the working robot 1, the reader-writer 50 transmits a signal for requesting desired data to the tag 10 by employing the radio wave having the second frequency, the tag 10 which received the latter signal transmits the requested data to the reader-writer 50 of the working robot 1.

Thus, the reader-writer 50 of the working robot 1 to which have been transmitted the desired data from the tag 10 outputs the very desired data to the computer of the working robot 1 through the controller 70, whereby the computer of the working robot 1 judges the contents of the data to carry out a maintenance operation such as renewal of parts and the like.

When finished the working, the reader-writer 50 of the working robot 1 transmits information of the completion of working together with the maintenance information to the tag 10 by using the radio wave having the second frequency.

After the completion of working, the tag 10 enters a low power consumption mode wherein electric power is supplied to only the power receiving section 30 from the secondary battery 38, so that the working robot 1 goes to the next apparatus B, and then maintenance and inspection are carried out as to the part b.

In the case when the working robot 1 goes to the next apparatus B, there is a possibility where the working robot 2 is in still a working condition. On that occasion, the reader-writers 50 on board of the respective working robots 1 and 2 communicate locally with each other at a short distance, to thereby prevent from a collision of the working robot 1 with the working robot 2.

Furthermore, in the case where there is a need of changing working contents or a working route with respect to the working robot 2, the data therefor may be allowed to convey by another working robot which stays nearby the working robot 2, whereby it is possible to write the data into the tag 10 of the working robot 2, or to directly deliver the same to the working robot 2 by means of local communications.

The above described radio wave having the first frequency and the radio wave having the second frequency include the codes for individually identifying the respective tags 10 and the respective reader-writers 50, these codes are discriminated by the respective ID discriminating sections 24 of the tags 10 as well as the respective ID discriminating sections 64 of the reader-writers 50, so that it is possible to operate only a desired tag or a reader-writer.

In the above described embodiment, while it has been constituted in such that the radio wave (electric power wave) having the first frequency is received by the power receiving section 30, and then the charging section 36 charges the secondary battery 38 by means of the radio wave having the first frequency, the invention is not limited thereto, but it may be modified to obtain electric power from a solar battery by the power receiving section 30.

As described above, according to the present embodiment, since the transmission and the reception of data among the tags 10 and the reader-writers 50 are effected in accordance with a wireless non-contact manner wherein radio waves are used, it is possible to transmit and receive data of a high degree of freedom irrespective of the positions and the directions of devices on the sides of transmission and reception.

Moreover, since the tag 10 and the reader-writer 50 are equipped with a microcomputer, respectively, it is possible to realize the transmission and the reception of intelligent data extending over a wide range. More specifically, it becomes possible to open a program area with respect to a specific tag belonging to a specified user, besides it becomes also to easily achieve reprogramming in accordance with a specific order.

Furthermore, as described above, since the tag 10 and the reader-writer 50 are equipped with a microcomputer, respectively, it is possible to realize data compression and high-speed data transmission, so that a data processing time can be reduced, whereby lower power consumption can be intended. In addition, due to data-hold function for checking or collating the ID codes, the data carrier system according to the present invention has high security.

Still further, since the tags 10 and the reader-writers 50 in the present invention are the ones equipped with a microcomputer, respectively, a protocol for avoiding collision of data may also be allowed to hold by themselves in the case where a plurality of tags and reader-writers exist within each detecting range of the respective tags and the respective reader-writers.

Moreover, since the secondary battery 38 is used as the power source in the tag 10, there is no problem of an electric power shortage, besides it is not required to perform complicated operations for exchanging a battery, and the like operations.

In the above described embodiment, while the reader-writer 50 has been equipped with the electric power supply unit 54 including the secondary battery 80 and the like, the invention is not limited thereto. More specifically, the reader-writer 50 is not equipped with the electric power supply unit 54 having a complicated constitution including the secondary battery 80 and the like, but the reader-writer 50 may be equipped with a power source means which supplies the electric power fed simply from an external power source to the data processing unit 52, whereby electric power is stably supplied always to the data processing unit 52 from the outside.

Since the present invention has been constructed as described above, a distance in which transmission and reception of data are possible can be extended, besides there is no restriction with respect to positions and directions of the devices on the transmitting side as well as those on the receiving side, and further a problem of shortage for electric power can be eliminated without accompanying complicated operations for exchange a battery and the like operations, whereby stable actions can be assured. Furthermore, according to the present invention, individual devices on the transmitting side as well as those on the receiving side can positively be discriminated.

It will be appreciated by those of ordinary skill in the art that the present invention can be embodied in other specific forms without departing from the spirit or essential characteristics thereof.

The presently disclosed embodiment is therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A data carrier system which performs transmission and reception of data in a non-contacting manner using weak radio waves, said system comprising:
    a plurality of tags and a plurality of reader-writers;
    each of said plurality of tags comprising:
        a first microcomputer as a controller;
        a battery as a first power source;
        a first storing means for storing and retrieving data;
        a first receiving means capable of receiving data transmitted from any reader-writer of said plurality of reader-writers and any other tag of said plurality of tags;
        a first transmitting means capable of transmitting data, stored in said first storing means, in a form of weak radio waves; and
        a first write enabling means for directing said first storing means to store data;
    each of said plurality of reader-writers comprising:
        a second microcomputer as a controller;
        a second storing means for storing and retrieving data;
        a second receiving means capable of receiving data transmitted from any other reader-writer of said plurality of reader-writers or any tag of said plurality of tags;
        a second transmitting means capable of transmitting data, stored in said second storing means, in a form of weak radio waves; and
        a second write enabling means for directing said second storing means to store data.

2. The system according to claim 1, wherein said first and second transmitting means are capable of transmitting weak radio waves in a high frequency range.

3. The system according to claim 1, wherein said first and second transmitting means are capable of transmitting weak radio waves in a very high frequency range.

4. The system according to claim 1, wherein the data transmitted by said first transmitting means requests data stored in a specific reader-writer of said plurality of reader-writers or a specific tag of said plurality of tags.

5. The system according to claim 1, wherein the data transmitted by said first transmitting means instructs that data be stored in a specific reader-writer of said plurality of reader-writers or a specific tag of said plurality of tags.

6. The system according to claim 1, wherein the data transmitted by said second transmitting means requests data stored in a specific reader-writer of said plurality of reader-writers or a specific tag of said plurality of tags.

7. The system according to claim 1, wherein the data transmitted by said second transmitting means instructs that data be stored in a specific reader-writer of said plurality of reader-writers or a specific tag of said plurality of tags.

8. The system according to claim 1, wherein the data transmitted by said first transmitting means includes a code unique to a specific reader-writer of said plurality of reader-writers or unique to a specific tag of said plurality of tags.

9. The system according to claim 1, wherein the data transmitted by said second transmitting means includes a code unique to a specific reader-writer of said plurality of reader-writers or unique to a specific tag of said plurality of tags.

10. The system according to claim 1, wherein each of said plurality of reader-writers further comprises a second power source.

11. The system according to claim 10, wherein said first and second transmitting means are capable of transmitting weak radio waves in a high frequency range.

12. The system according to claim 10, wherein said first and second transmitting means are capable of transmitting weak radio waves in a very high frequency range.

13. The system according to claim 10, wherein the data transmitted by said first transmitting means requests data stored in a specific reader-writer of said plurality of reader-writers or a specific tag of said plurality of tags.

14. The system according to claim 10, wherein the data transmitted by said first transmitting means instructs that data be stored in a specific reader-writer of said plurality of reader-writers or a specific tag of said plurality of tags.

15. The system according to claim 10, wherein the data transmitted by said second transmitting means requests data stored in a specific reader-writer of said plurality of reader-writers or a specific tag of said plurality of tags.

16. The system according to claim 10, wherein the data transmitted by said second transmitting means instructs that data be stored in a specific reader-writer of said plurality of reader-writers or a specific tag of said plurality of tags.

17. The system according to claim 10, wherein the data transmitted by said first transmitting means includes a code unique to a specific reader-writer of said plurality of reader-writers or unique to a specific tag of said plurality of tags.

18. The system according to claim 10, wherein the data transmitted by said second transmitting means includes a code unique to a specific reader-writer of said plurality of reader-writers or unique to a specific tag of said plurality of tags.

* * * * *